No. 882,317. PATENTED MAR. 17, 1908.
G. G. HOWE.
CHAIN LINK.
APPLICATION FILED JUNE 26, 1905.

WITNESSES
R A Balderson
Warren W Swartz

INVENTOR
Glenn G Howe
by Balderson & Byrnes
his attys

UNITED STATES PATENT OFFICE.

GLENN G. HOWE, OF INDIANAPOLIS, INDIANA.

CHAIN-LINK.

No. 882,317.  Specification of Letters Patent.  Patented March 17, 1908.

Application filed June 26, 1905. Serial No. 266,969.

*To all whom it may concern:*

Be it known that I, GLENN G. HOWE, of Indianapolis, Marion county, Indiana, have invented a new and useful Improvement in Chain-Links, of which the following is a full, clear, and exact description, reference being had to the accompanying drawings, forming part of this specification, in which—

Figure 1:
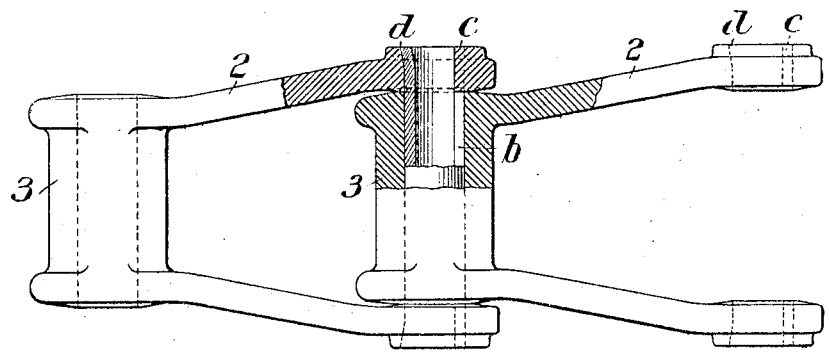
Figure 2:
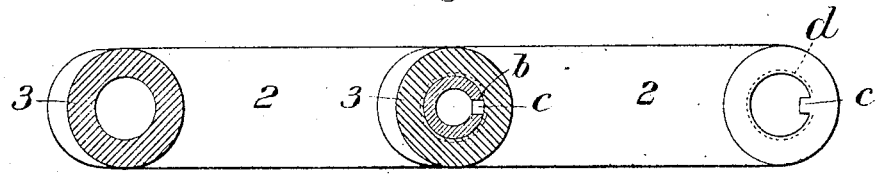
Figure 3:
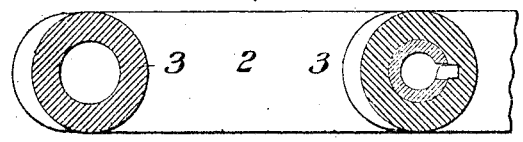
Figure 4:
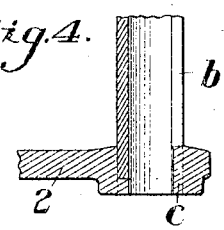

Figure 1 is a plan view of my invention partly in section, showing my preferred form of construction; Fig. 2 is a transverse section; Fig. 3 is a similar section, showing a modified construction, and Fig. 4 shows a further modification.

My invention consists in a cast metal chain, the side members of which at one end are united by a tubular steel pin, the edges of which are not welded together while the other link is constituted by members which are integral with the side members and may be of a single piece. This construction affords a chain link which is very simple in its construction and is strong, giving a good bearing surface for the adjacent link, so that chains thus constructed are very durable and efficient.

In the drawing Fig. 1 shows a chain link having side members 2, 2 which are connected at one end by an integral hollow end member 3. The free ends of the side members are connected by an interposed tubular steel pin the ends of which are inserted within the eyes at the ends of the side members and are preferably flush with the outer surface of the side members. This pin is made by bending a piece of steel into tubular form, but without bringing its edges into welding contact, preferably leaving a slot $b$ extending from end to end of the pin. This pin is prevented from rotation in the eyes of the side members by means of interior projections $c$ in the latter, which fit within the ends of the slot, or as shown in Fig. 3 the eyes may be provided with slots and the pin provided with out-turned lips which fit in the slots. To hold the pin from endwise motion in the link, I prefer to form the eyes of the side members with external laterally recessed portions $d$ which may extend all around the eyes and to swage the ends of the tubular pin or to upset the same so as to fill said recesses, or as shown in Fig. 4 I may form notches in the ends of the tubular pin and projections on the exterior of the side members of the link, which projections when the pins are in place are hammered down or upset into the notches so as to hold the pins from displacement. In either case the pin is held firmly in the link. The seam or joint between the opposing edges of the tubular pin is situated on the outer side of the link so that the wearing surface presented by the pin is on the unslotted smooth side.

My invention may be modified in form and arrangement, since

What I claim is:—

A chain comprising a link having a tubular connecting portion at one end, and open at the opposite end, the side members at the open end being thickened at the outer side and formed with openings therethrough, and a tubular pin extending through the said openings and through the tubular connecting portion of the adjacent link, said pin being interlocked with and upset in the side members in the thickened portions thereof to prevent rotation and also endwise movement of the pin; the outer ends of the pin being flush with the outer surfaces of the side members substantially as described.

In testimony whereof, I have hereunto set my hand .

GLENN G. HOWE.

Witnesses:
THOMAS W. BAKEWELL,
GEO. B. BLEMING.